(12) United States Patent
Subramanyam et al.

(10) Patent No.: US 8,010,567 B2
(45) Date of Patent: Aug. 30, 2011

(54) FEDERATED ONTOLOGY INDEX TO ENTERPRISE KNOWLEDGE

(75) Inventors: Sridhar Subramanyam, Rochester Hills, MI (US); Andrea M. Simon, Wolverine Lake, MI (US); Kurt S. Godden, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1086 days.

(21) Appl. No.: 11/760,272

(22) Filed: Jun. 8, 2007

(65) Prior Publication Data
US 2008/0307523 A1    Dec. 11, 2008

(51) Int. Cl.
*G06F 17/00* (2006.01)
(52) U.S. Cl. ......... 707/791; 707/802; 707/822; 707/828
(58) Field of Classification Search ........... 707/600–831
See application file for complete search history.

(56) References Cited

U.S. PATENT DOCUMENTS

| | | |
|---|---|---|
| 6,311,194 B1 | 10/2001 | Sheth et al. |
| 6,701,314 B1 | 3/2004 | Conover et al. |
| 7,200,589 B1 | 4/2007 | Graupner |
| 2006/0047632 A1* | 3/2006 | Zhang ............................. 707/3 |
| 2006/0053151 A1* | 3/2006 | Gardner et al. ............... 707/102 |

OTHER PUBLICATIONS

Written Opinion of the International Searching Authority; PCT/US2008/061082; Aug. 27, 2008.
International Search Report; PCT/US2008/061082; Aug. 27, 2008.

* cited by examiner

*Primary Examiner* — Isaac M Woo
(74) *Attorney, Agent, or Firm* — Cantor Colburn LLP (57) ABSTRACT

A method, system, and computer program product for using a federated ontology as an index to enterprise knowledge are provided. The method includes receiving a request for the enterprise knowledge, mapping the request to a concept within the federated ontology, and searching the federated ontology for the concept to identify one or more data sources holding the enterprise knowledge. The method further includes retrieving the enterprise knowledge from the identified one or more data sources as search result data, and returning the search result data.

20 Claims, 7 Drawing Sheets

FEDERATED ONTOLOGY INDEX TO ENTERPRISE KNOWLEDGE

BACKGROUND OF THE INVENTION

The present disclosure relates to information management and more particularly to using a federated ontology as an index to enterprise knowledge.

In developing and manufacturing complex products, a large number of parties, groups, and business units in an enterprise may be involved, requiring differing levels of access to vast quantities of data. For example, an automobile manufacturer may manufacture or purchase thousands of different parts in support of building one or more vehicle models. The parties, groups, and business units involved in manufacturing a complex product often desire customized views to data but lack the ability to access each other's databases to extract useful knowledge stored therein. Due to the sheer volume of data and specific requirements for the primary users of the data, many businesses have developed separate customized solutions of limited scale to support the needs of a specific class of user. For example, an engineering group may store and access data related to the design and development cycle of a particular part or type of part incorporated into another product, e.g., a vacuum hose for vehicle. Other groups, such as purchasing, marketing, and service, may have access to information related to a variety of parts, particular vehicles, or supplier data that could be useful to other groups for numerous applications.

An example application where it would be useful to have access to a wide array of data sources is in servicing warranty claims. A service group may log customer issues and the service provided to customers in the field. It would be beneficial for part failures on particular products to be traced back to a supplier or a design group to rapidly isolate the root cause and allocate warranty costs. However, current enterprise systems with numerous data repositories spread over geographically diverse locations and organized without a standardized approach present a substantial challenge in tracing through the data to extract useful information (e.g., identifying a particular supplier of a part in a particular vehicle). The more complex a product, combined with the use of multiple suppliers for a given part within a product, yields greater data integration challenges. Additionally, an enterprise that relies upon a number of legacy systems may find it infeasible to convert the systems into a common format, necessitating the continued use and maintenance of multiple disparate systems.

Accordingly, there is a need in the art for a federated ontology index to enterprise knowledge.

BRIEF DESCRIPTION OF THE INVENTION

An embodiment of the invention includes a method for using a federated ontology as an index to enterprise knowledge. The method includes receiving a request for the enterprise knowledge, mapping the request to a concept within the federated ontology, and searching the federated ontology for the concept to identify one or more data sources holding the enterprise knowledge. The method further includes retrieving the enterprise knowledge from the identified one or more data sources as search result data, and returning the search result data.

Another embodiment of the invention includes a system for using a federated ontology as an index to enterprise knowledge. The system includes a host system and one or more storage devices in communication with the host system. The one or more storage devices hold data sources of the enterprise knowledge. The system further includes a federate ontology accessible via a host system, and a semantic router application executing on the host system. The semantic router application includes computer instructions for performing: receiving a request for the enterprise knowledge, mapping the request to a concept within the federated ontology, searching the federated ontology for the concept to identify the one or more data sources holding the enterprise knowledge, retrieving the enterprise knowledge from the identified one or more data sources as search result data, and returning the search result data.

A further embodiment of the invention includes a computer program product for using a federated ontology as an index to enterprise knowledge. The computer program product includes a storage medium readable by a processing circuit and storing instructions for execution by the processing circuit for implementing a method. The method includes receiving a request for the enterprise knowledge formatted as a question inquiring about the enterprise knowledge. The method further includes mapping the request to a concept within the federated ontology. The federated ontology is comprised of a first localized ontology linked with a second localized ontology through a common concept contained within each of the first and second localized ontologies. The method also includes searching the federated ontology for the concept to identify one or more data sources holding the enterprise knowledge, and retrieving the enterprise knowledge from the identified one or more data sources as search result data. The method additionally includes formatting the search result data as an answer to the question, and returning the search result data formatted as the answer to the question.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring to the exemplary drawings wherein like elements are numbered alike in the accompanying Figures.

DETAILED DESCRIPTION OF THE INVENTION

Exemplary embodiments, as shown and described by the various figures and the accompanying text, provide methods, systems and computer program products for using a federated ontology as an index to enterprise knowledge. In an enterprise environment, such as a large corporation, there may be many disparate data sources customized for use by particular parties, groups, or business units. For example, several engineers may be part of a larger engineering group, and develop a customized database to support the development of a particular project. There may also be databases of wider accessibility, such as a database that is accessible to all engineers in a group, or to parties across multiple groups that are part of a common business unit, such as engine development and manufacturing. An ontology provides a formalized specification of one or more concepts, such as interrelationships between parts in a manufactured product, suppliers of parts, and service performed on the manufactured product. An ontology may be used to model a variety of relationships in different domains based on a particular perspective. For example, in an automotive manufacturing environment, multiple ontologies may be developed that relate vehicles, parts, and warranty claims from a quality or warranty perspective. As different participants in an enterprise environment can have differing views of a process, localized ontologies can be developed for each perspective. A "localized ontology" refers to an ontology developed from a particular perspective, such as a business domain (e.g., marketing, purchasing, engineering, service and the like), and is not limited to a single data source, such as a database. Localized ontologies may be linked or federated to form a federated ontology, enabling the localized ontologies to be treated as a single larger ontology while still maintaining the localized ontologies. A "federated ontology" refers to the combination of two or more localized (smaller) ontologies through linking the two or more localized ontologies through a common concept. Multiple localized ontologies may be linked through a common concept between all of the localized ontologies, or the linking points can vary as a first and second localized ontology may have one concept in common, while the second and a third ontology may have a different concept in common. When the federated ontology links multiple localized ontologies, the federated ontology may be referred to as a "master ontology", as the federated ontology may provide a single access point to the knowledge contained within all of the linked localized ontologies.

In exemplary embodiments a master ontology is developed from various data sources, such as multiple databases. In an enterprise environment, the master ontology may include information related to a warranty, such as a vehicle warranty, including activities from a wide array of sources, such as engineering, purchasing, suppliers, plants, shipping, field performance evaluation, and recalls. Preparing data for use in the master ontology may involve semantically tagging information at the data sources, as some data may be part of a localized ontology and other data may not have been incorporated into any ontology prior to developing the master ontology. In exemplary embodiments, localized ontologies are created or identified in the enterprise environment, establishing relationships between concepts and the data sources that hold the data.

In exemplary embodiments, a mapping from various data sources to the master ontology is performed. The mapping process may include identifying or creating localized ontology structures involving multiple data sources. The localized ontologies may be linked through one or more shared concepts in common between the localized ontologies. The mapping and linking processes remove redundancies and overlaps between the various data sources, forming a larger federated or master ontology that links the localized concepts and relationships into a coherent structure, providing access to large volumes of data that would otherwise be inaccessible across localized ontology boundaries. The master ontology may serve as the primary source to answer relevant questions instead of directly interrogating the individual data sources or the independent localized ontologies. In exemplary embodiments, the master ontology provides insight into relationships between data and properties of the data, such as the location and contents of data sources. Questions directed to data sources may be of a general or a specific nature. In an automotive manufacturing environment, a relevant question may be, "Is as-built vehicle information captured and stored during the vehicle build process?" or "How many warranty claims have been submitted against part ABC123, and which plants assembled the parts into vehicles?" Through the master ontology, an inquiring party does not need to know the location or specific contents of various data sources within the enterprise, as the master (federated) ontology serves as an index to the enterprise knowledge, supporting both information technology (IT) queries about the structure and location of data sources, as well as business queries regarding business concepts and relationships.

In exemplary embodiments, a semantic router uses the master ontology to track and trace information through various data sources until the data is stored in a repository for future use. The information may include data generated for each vehicle manufactured in an automotive manufacturing environment. The information may also include general supply chain information such as a quantity of parts delivered to a particular assembly plant from each part supplier. Each data source may be heterogeneous, organized with a local database schema that makes traditional structured query language (SQL) based queries difficult to perform across multiple data sources. Once a mapping is established for the master ontology, routes to individual data sources can be identified. In exemplary embodiments, the ontology approach to indexing data sources establishes a new multi-data source schema, providing a path to the data and an organization based upon a broader view of relationships between data tailored to a perspective for solving a particular problem, such as product warranty cost allocation between supply chain members. For example, when the particular problem to be solved is tracking and tracing of warranty information, localized ontologies can be constructed to access the corresponding data sources to enable rapid access to the knowledge stored in the data sources. The localized ontologies can be linked into a federated or master ontology to support constructing queries across the data sources. Tracing activity can locate the data sources involved in the mapping process and may enable a user to follow the flow of a particular item through multiple data sources, e.g., from part purchasing, to manufacturing, to service in the field. The availability of a master ontology precludes the need for generating and creating a routing path for the trace information apriori for different systems and data sources. As systems and data sources are changed or retired, the ontology mappings to the newly added systems are updated rather than altering hard-coded route data routing paths.

In exemplary embodiments, the master ontology supports traceability and/or part linking relationships. Traceability may include the capability to track specific low-level details, such as associating a particular part serial number (e.g., AB12345-0001) with an end product, e.g., an airbag serial number with a vehicle identification number (VIN). Part linking may include combining various sources of data related to a higher-level part number (e.g., part 12345), rather than a specific part serial number to a specific product (e.g., AB12345-0001 on VIN2, where AB12345-0001 is a specific instance of part 12345 and VIN2 is a specific instance of a vehicle). For example, Database 1 (DB1) may indicate that part number 12345 is used on Vehicle Type V with options 45 and 46. Database 2 (DB2) may indicate that Assembly Plant Y builds Vehicle Type V. Database 3 (DB3) may indicate that Supplier J supplies part 12345 to Assembly Plants X, Y, and Z, and Supplier K supplies part 12345 to Assembly Plants A, B and C. Database 4 (DB4) may indicate that Vehicles VIN1, VIN2, and VIN3 of Vehicle Type V were built at Assembly Plant Y. Database 5 (DB5) may indicate the amount spent for warranty claims on a per VIN basis. By linking the data in the databases (DB1-DB5) together, a question such as, "How much is Supplier J costing us in warranty claims?" can be answered, which could not otherwise be answered from a single database (DB1-DB5).

Figure 1:
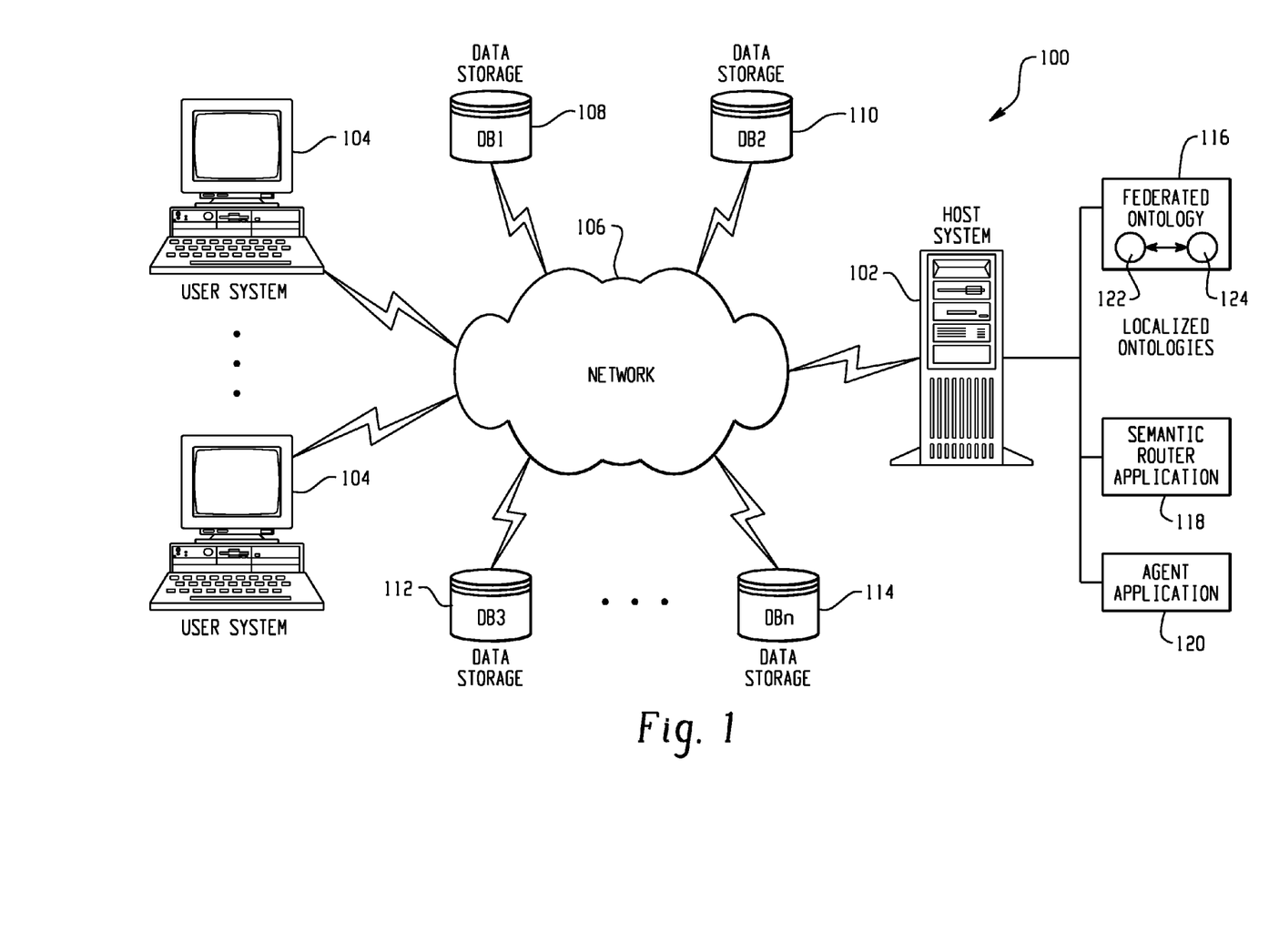
FIG. 1 depicts an exemplary system for using a federated ontology as an index to enterprise knowledge that may be utilized by exemplary embodiments.

In exemplary embodiments, agent applications use the master ontology to mine information, report data trends, and provide visibility to users. For example, an engineer may want to locate warranty information relevant to his or her context, such as a part that he or she is responsible for developing. Alternatively, a user may desire to have issues related to supplier accountability highlighted for a specific warranty problem. An agent application may be configured to monitor and trigger on certain events, such as unusually high warranty costs related to a particular part, which may be of interest to a design engineer responsible for the part. Notice of unusually low warranty costs associated with a particular part may also be beneficial to a design team for identifying preferred parts to use in other designs. In exemplary embodiments, the agent application can be configured to monitor for exceeding a positive or negative threshold for any information held within the master ontology. The agent application may periodically query the master ontology either through the semantic router, or independent of the semantic router, for search result data that may assist in tracking data trends or alerting one or more users of the agent application of a value above or below a threshold Turning now to the drawings, it will be seen that in FIG. 1 there is a block diagram of a system 100 upon which using a federated ontology as an index to enterprise knowledge is implemented in exemplary embodiments. The system 100 of FIG. 1 includes a host system 102 in communication with user systems 104 over a network 106. The host system 102 may be a high-speed processing device (e.g., a mainframe computer) that handles large volumes of processing requests from user systems 104. In exemplary embodiments, the host system 102 functions as an application server, a database management server, and a web server. User systems 104 may comprise desktop or general-purpose computer devices that generate data and processing requests. While only a single host system 102 is shown in FIG. 1, it will be understood that multiple host systems may be implemented, each in communication with one another via direct coupling or via one or more networks. For example, multiple host systems may be interconnected through a distributed network architecture. The single host system 102 may also represent a cluster of hosts accessing data storage devices 108-114.

The network 106 may be any type of communications network known in the art. For example, the network 106 may be an intranet, extranet, or an internetwork, such as the Internet, or a combination thereof. The network 106 may be a wireless or wireline network.

The data storage devices 108-114 refer to any type of storage and may comprise a secondary storage element, e.g., hard disk drive, tape, or a storage subsystem that is external to the host system 102. Types of data that may be stored in data storage device 108-114 include databases (DB1 . . . DBn) with tables or records of data. It will be understood that the data storage devices 108-114 shown in FIG. 1 are provided for purposes of simplification and ease of explanation and are not to be construed as limiting in scope. To the contrary, there may be any number data storage devices (1 . . . n) accessible by the host system 102. The data storage devices 108-114 may be accessed by the host system 102 through the network 106. In exemplary embodiments, the user systems 104 can read or write to individual databases on data storage devices based upon the access permissions of the individual user of the user systems 104. Various users and owners of data may have different permission levels. For example, a service technician may have read and write access to a service history database located on a particular data storage device, e.g., DB2 on data storage device 110. Although the data storage devices 108-114 are depicted as directly coupled to the network 106, it will be understood that other computing resources known in the art may be present to control access and manage data flow between the data storage devices 108-114 and the network 106, e.g., a firewall and/or a database management application.

In exemplary embodiments, the host system 102 executes various applications that access a federated ontology 116, such as a semantic router application 118 and one or more agent applications 120. Other applications, e.g., business applications, a web server, etc., may also be implemented by the host system 102 as dictated by the needs of the enterprise of the host system 102. The federated ontology 116 may be comprised of two or more localized ontologies, such as localized ontologies 122 and 124, which are linked through one or more common concepts within each localized ontology. The localized ontologies 122 and 124 may include concepts linked by relationships organized with a different scope or point of view, such as as-built vehicle information and as-marketed vehicle information. In exemplary embodiments, the localized ontologies 122 and 124 map to one or more of the databases (DB1 . . . DBn) in the data storage devices 108-114, serving as data sources for the localized ontologies 122 and 124. The federated ontology 116 may be a master ontology if the federated ontology is relied upon as a primary source of information and an index to enterprise knowledge.

In exemplary embodiments, the user systems 104 access the host system 102 to request access to the federated ontology 116, to search the federated ontology 116, to extract data from data sources mapped through the federated ontology 116, or perform update and configuration operations to the federated ontology 116 and/or the localized ontologies 122 and 124. Different views and access to the federated ontology 116 may be provided for each user depending upon permissions or security clearance of each user of the user systems 104. As described in greater detail herein, the federated ontology 116 establishes relationships between database fields in from the data storage devices 108-114 based on a particular business domain. In exemplary embodiments, the semantic router application 118 uses the federated ontology 116 as an index into enterprise data. The index functionality can be used to determine information paths and provide trace information in response to a request. The semantic router application 118 may convert a query or question from the user systems 104 or the agent application 120 into concept and/or relationship terms compatible with the format of the federated ontology 116. When the semantic router application 118 performs a search of the federated ontology 116 and extracts result data, the semantic router application 118 may format the result data as an answer to the query or question. In exemplary embodiments, the agent application 120 uses the federated ontology 116 to mine for information and alert/notify user systems 104 of anomalies. The applications 118 and 120 may be managed and configured as separate applications or may be combined into any combination of larger applications, including a single comprehensive application. Any module, sub-component, or portion of the applications 118 and 120, as well as the ontologies 116, 122 and 124, may be executed or stored on any combination of the user systems 104, e.g., a distributed application architecture.

In exemplary embodiments, the localized ontologies 122 and 124 are represented in different namespaces to remove ambiguity between objects of different origins when multiple sources are combined. Each localized ontology 122 and 124 may be organized as a data structure of classes, properties, and individuals. Classes may represent objects of a domain. Properties establish relationships between objects. Individuals may be actual representatives of a class with the associated characteristic properties. In exemplary embodiments, object properties establish relationships between classes, while data type properties relate classes to individuals. An ontology framework may be developed using any tools known in the art, such as web ontology language (OWL) executed upon the host system 102 or remotely. In exemplary embodiments, ontology namespaces are organized based on a point of view of the information. For example, in an automotive manufacturing environment, namespaces may be organized based on the point of view of a vehicle as built, as engineered, as supplied (e.g., for parts of a vehicle), as marketed, as serviced, or a common view.

Figure 2:
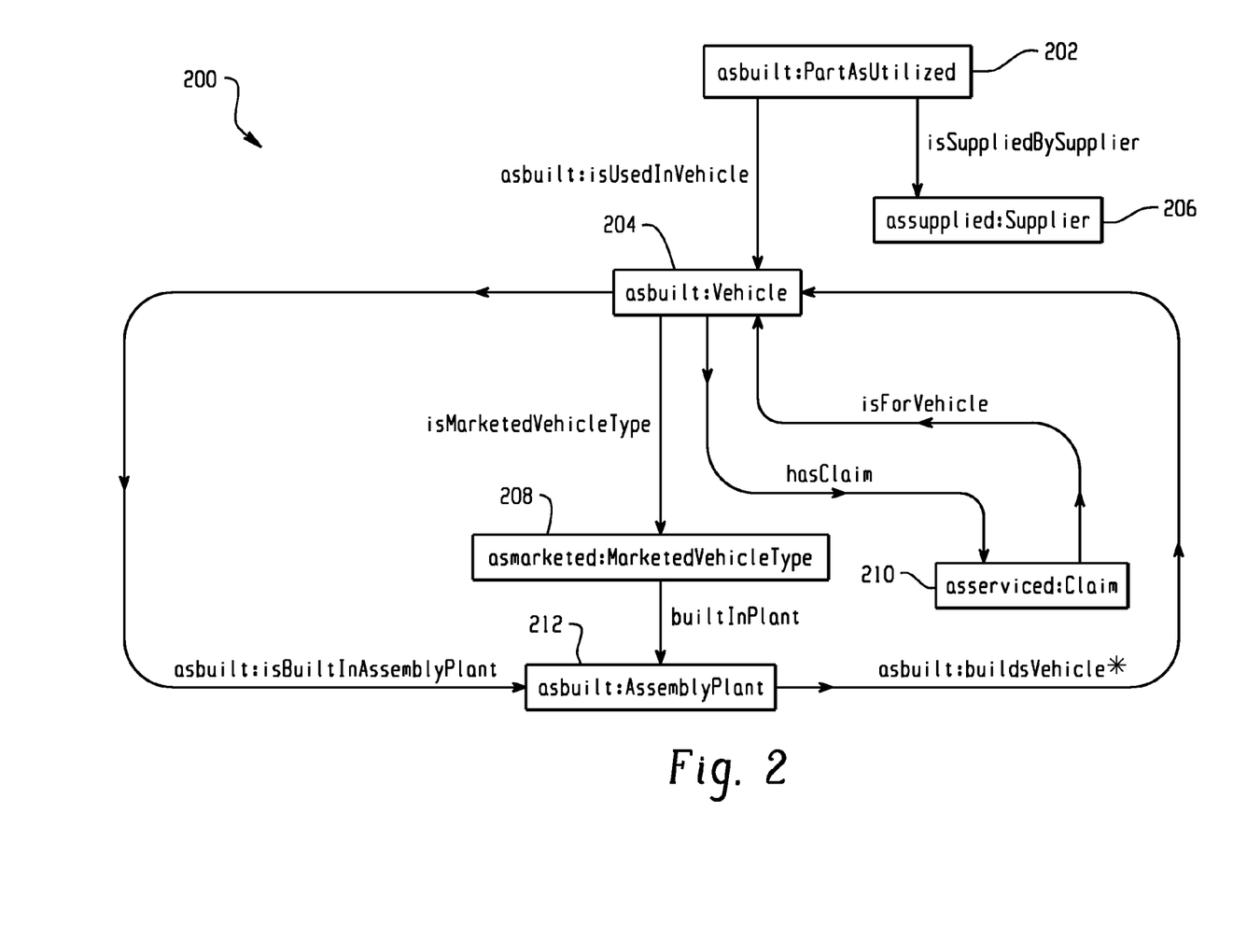
FIG. 2 depicts an exemplary ontology for product assembly concepts that may be utilized by exemplary embodiments.

Turning now to FIG. 2, a localized ontology 200 for product assembly concepts will now be described in accordance with exemplary embodiments. While the example depicted in FIG. 2 is specific to vehicle production, it will be understood that the inventive principles can be applied to a wide range of products and applications, such as consumer products. Block 202 depicts a class in the asbuilt namespace, "asbuilt:PartAsUtilized", representing the physical parts that are used to build each vehicle, with instances of the class corresponding to individual parts used to build each vehicle. Block 204 depicts a class in the asbuilt namespace, "asbuilt:Vehicle", representing vehicles built, with each instance corresponding to an individual manufactured vehicle. Block 206 depicts a class in the assupplied namespace, "assupplied:Supplier", representing part suppliers, with each instance corresponding to an individual part supplier. Block 208 depicts a class in the asmarketed namespace, "asmarketed:MarketedVehicleType", representing different vehicle models and options marketed, with each instance corresponding to individual option combinations based on factors such as model and model year. Block 210 depicts a class in the asserviced namespace, "asserviced:Claim", representing a warranty claim made against a vehicle including costs, with each instance corresponding to an actual claim made against a vehicle. Claims may include a number of attributes such as a labor code, a part number involved, mileage, and other relevant information. Block 212 depicts a class in the asbuilt namespace, "asbuilt:AssemblyPlant", representing plants where vehicles are manufactured or assembled, with each instance corresponding to actual assembly plants.

The localized ontology 200 is established based on the relationships of each class to each other, forming logical associations through properties defined in various namespaces. For example, block 202, "asbuilt:PartAsUtilized", is related to block 204, "asbuilt:Vehicle", with an "asbuilt:isUsedInVehicle" relationship. Block 202, "asbuilt:PartAsUtilized", is also related to block 206, "assupplied:Supplier", with an "isSuppliedBySupplier" relationship. In the exemplary localized ontology 200 of FIG. 2, block 204, "asbuilt:Vehicle", has numerous relationships to other blocks. For example, block 204, "asbuilt:Vehicle", is related to block 208, "asmarketed:MarketedVehicleType", with an "isMarketedVehicleType" relationship. There may be multiple relationships established between a pair of classes within an ontology, such as the localized ontology 200. For example, block 204, "asbuilt:Vehicle", is related to block 210, "asserviced:Claim", with a "hasclaim" and an "isForVehicle" relationship. Block 204, "asbuilt:Vehicle", is also related to block 212, "asbuilt:AssemblyPlant", with an "asbuilt:isBuiltInAssemblyPlant" and an "asbuilt:buildsVehicle" relationship. Block 208, "asmarketed:MarketedVehicleType", is related to block 212, "asbuilt:AssemblyPlant", with a "builtInPlant" relationship. The interconnections and relationships between classes establish a framework between classes that enables searches through the localized ontology 200 when mapped to specific instances of data. For example, the localized ontology 200 can be used to determine information about particular parts used in vehicles that have been manufactured at a particular assembly plant or plants, and identify the supplier of the parts.

Figure 3:
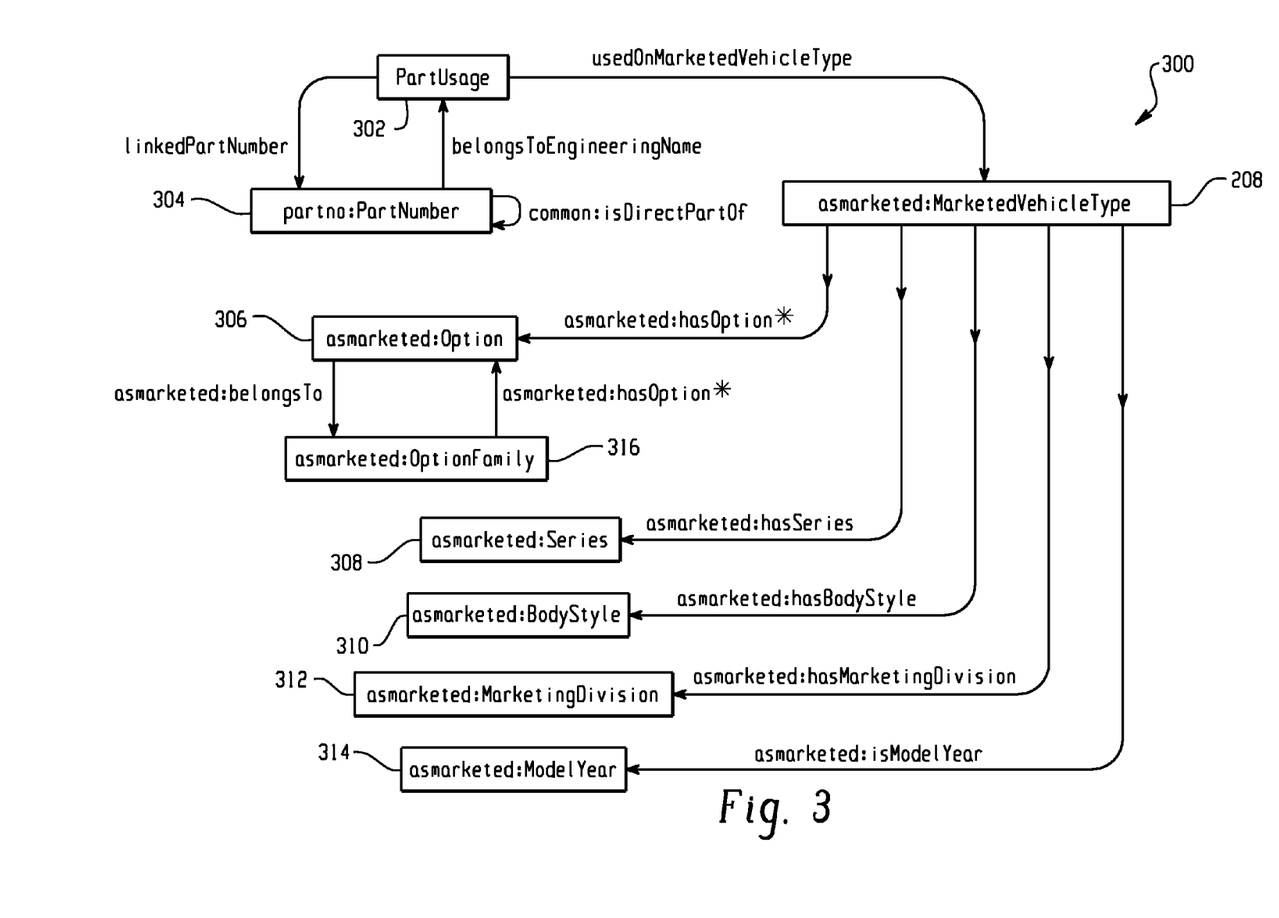
FIG. 3 depicts an exemplary ontology for product marketing concepts that may be utilized by exemplary embodiments.

Turning now to FIG. 3, a localized ontology 300 for product marketing concepts will now be described in accordance with exemplary embodiments. While the example depicted in FIG. 3 is specific to vehicle marketing, it will be understood that the inventive principles can be applied to a wide range of products and applications, such as consumer products. Block 302 depicts a class, "PartUsage", representing the parts that are designed and available to be used on vehicles, with instances of the class corresponding to individual parts used to build each vehicle type. Block 304 depicts a class in the partno namespace, "partno:PartNumber", representing a part that may be incorporated into an assembly, with each instance corresponding to an actual part. Block 208, "asmarketed:MarketedVehicleType", is the same as described in reference to the localized ontology 200 of FIG. 2. Block 306 depicts a class in the asmarketed namespace, "asmarketed:Option", representing various standard options that can be selected when purchasing a vehicle, e.g., a roof mounted radio antenna, with each instance corresponding to the actual options that can be selected for different vehicle model types. Block 308 depicts a class in the asmarketed namespace, "asmarketed:Series", representing a specific vehicle series or model, with each instance corresponding to an actual series or model, such as a Suburban, G6, or H2. Block 310 depicts a class in the asmarketed namespace, "asmarketed:BodyStyle", representing a vehicle body style, with each instance corresponding to actual body styles, such as 2-door car, 4-door car, etc. Block 312 depicts a class in the asmarketed namespace, "asmarketed:MarketingDivision", representing a marketing division, with each instance corresponding to actual marketing divisions. Block 314 depicts a class in the asmarketed namespace, "asmarketed:ModelYear", representing a model year, with each instance corresponding to an actual year in which a vehicle was designed. Block 316 depicts a class in the asmarketed namespace, "asmarketed:OptionFamily", representing an option family covering a group of options, with each instance corresponding to an actual option groups from which an option can be selected, e.g., engine type.

Similar to the localized ontology 200 of FIG. 2, the localized ontology 300 of FIG. 3 is established based on the relationships of each class to each other, forming logical associations through properties defined in various namespaces. For example, block 302, "PartUsage", is related to block 304, "partno:PartNumber", with a "linkedPartNumber" and a "belongsToEngineeringName" relationship. Instances of block 304, "partno:PartNumber" can be related to other members of the same class with a "common:isDirectPartOf" relationship, which may support assemblies of parts. Block 302, "PartUsage", is also related to block 208, "asmarketed:MarketedVehicleType", with a "usedOnMarketedVehicleType" relationship. As block 208 appears in both exemplary localized ontologies 200 and 300, it can serve as common concept or link between the localized ontologies 200 and 300 to form a larger federated ontology, similar to the localized ontologies 122 and 124 in the federated ontology 116 of FIG. 1. Block 208 of FIG. 3, "asmarketed:MarketedVehicleType", is central to the localized ontology 300, with relationships between blocks 306-314 as depicted in FIG. 3. Block 208, "asmarketed:MarketedVehicleType", has many relationships with other blocks, such as "asmarketed:hasOption", "asmarketed:hasSeries", "asmarketed:hasBodyStyle", "asmarketed:hasMarketingDivision", and "asmarketed:isModelYear". Block 316, "asmarketed:OptionFamily", has relationships of "asmarketed:belongsTo" and "asmarketed:hasOption" with block 306 "asmarketed:Option". Similar to the localized ontology 200 of FIG. 2, the localized ontology 300 of FIG. 3 utilizes interconnections and relationships between classes to establish a searchable framework when mapped to specific instances of data. For example, the localized ontology 300 can be used to determine information about part usage on vehicles based on available options for a selected vehicle type in a given model year.

Figure 4:
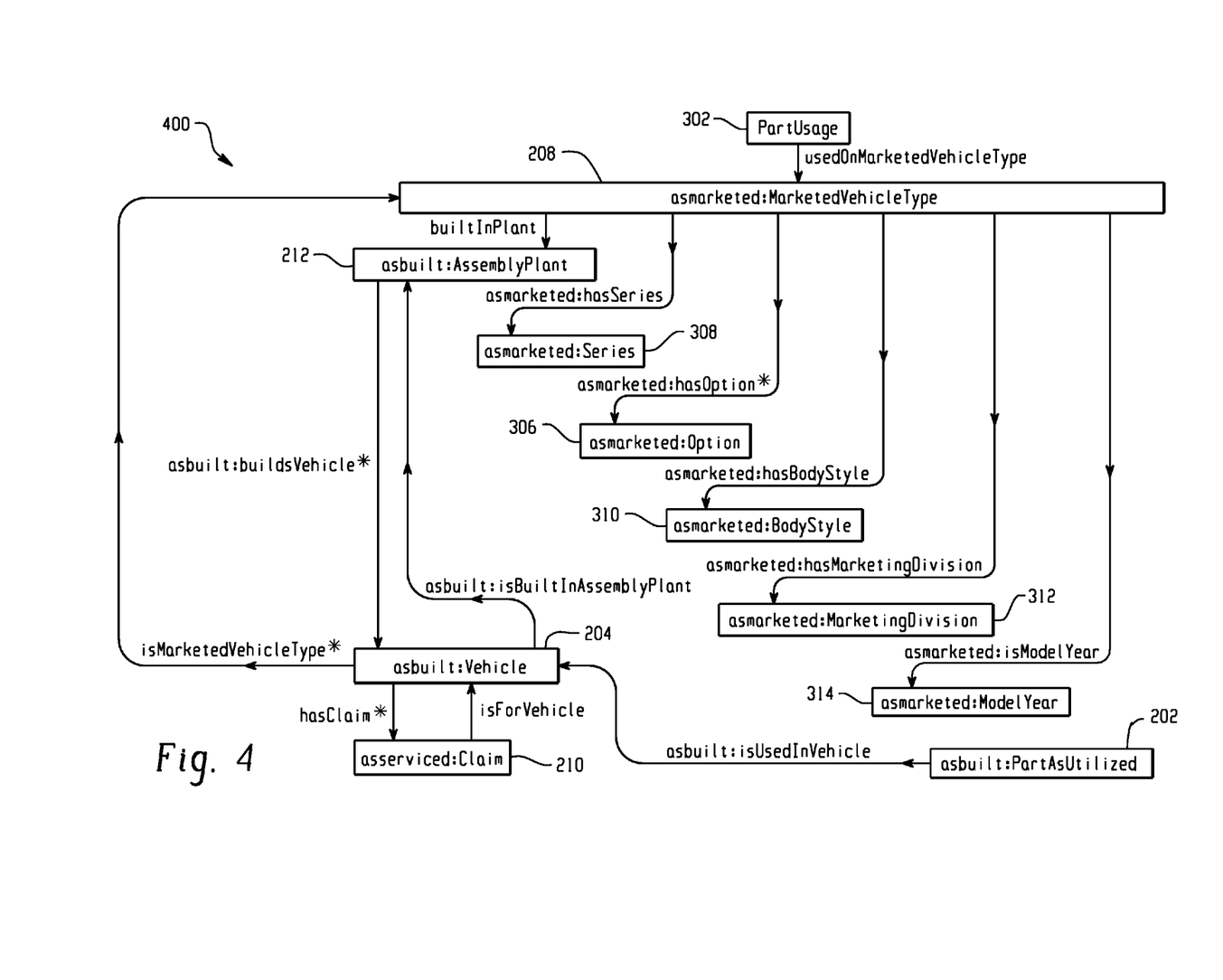
FIG. 4 depicts an exemplary federated ontology that may be utilized by exemplary embodiments.

Turning now to FIG. 4, a federated ontology 400 will now be described in accordance with exemplary embodiments. The federated ontology 400 depicts classes and relationships previously described in reference to the localized ontologies 200 and 300 of FIGS. 2 and 3. While not all classes and relationships are depicted in FIG. 4, for ease of illustration, it will be understood that all classes and relationships of the localized ontologies 200 and 300 of FIGS. 2 and 3 may be included in the federated ontology 400. The localized ontologies 200 and 300 in the federated ontology 400 represent exemplary embodiments of the localized ontologies 122 and 124 in the federated ontology 116 of FIG. 1, but do not limit the scope of the ontologies 116, 122 and 124 of FIG. 1. Merging different localized views of information may enable larger and more elaborate searches through the data. The federated ontology 400 may provide visibility to otherwise unknown or inaccessible data sources that could not be supplied by the localized ontologies 200 and 300 of FIGS. 2 and 3 individually. For example, a user of the localized ontology 300 of FIG. 3, may not know which assembly plant builds a particular vehicle, without access to the localized ontology 200 of FIG. 2. As additional local ontologies are incorporated into the federated ontology 400, a larger pool of knowledge is made available to the enterprise, enabling broader cross-functional inquiries without requiring extensive domain specific knowledge of each data source.

Figure 5:
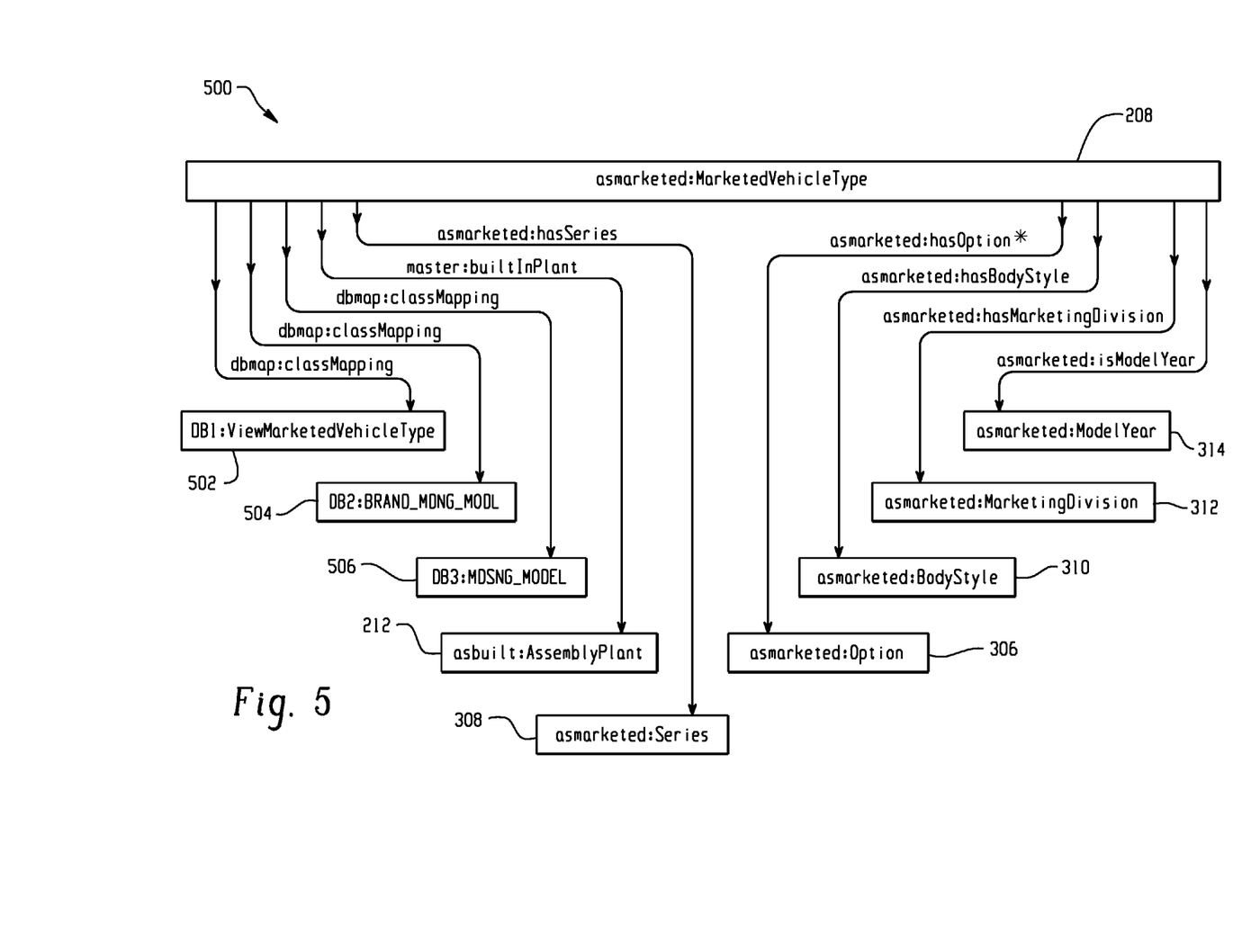
FIG. 5 depicts an exemplary federated ontology for mapping fields from a database to an ontology that may be utilized by exemplary embodiments.

Turning now to FIG. 5, an exemplary federated ontology 500 for mapping fields from databases to an ontology will now be described in accordance with exemplary embodiments. The exemplary federated ontology 500 includes previously described relationships with block 208, "asmarketed:MarketedVehicleType", to classes as detailed in the localized ontologies 200 and 300 of FIGS. 2 and 3. Additionally, blocks 502-506 are depicted with relationships "dbmap:classMapping" from block 208, defining database class mapping to the various data sources used to populate the federated ontology 500. The blocks 502-506 are depicted as exemplary data sources and should not be construed as limiting in scope, as any number of databases could be mapped to the federated ontology 500 based upon the needs of the enterprise and the existing data infrastructure. The databases represented by blocks 502-506 may include quality data, warranty claim information, product development data, and manufacturing data. The class mapping performed by the federated ontology 500 to various databases may enable a subset of heterogeneous data sources to be extracted via the federated ontology 500 and allow users of the ontologies 200-500 to locate data without specific knowledge of the organizational schema of each individual database. Thus, the federated ontology 500 serves as an index into enterprise data, which can be further expanded as the federated ontology 500 is linked with other ontologies.

Figure 6:
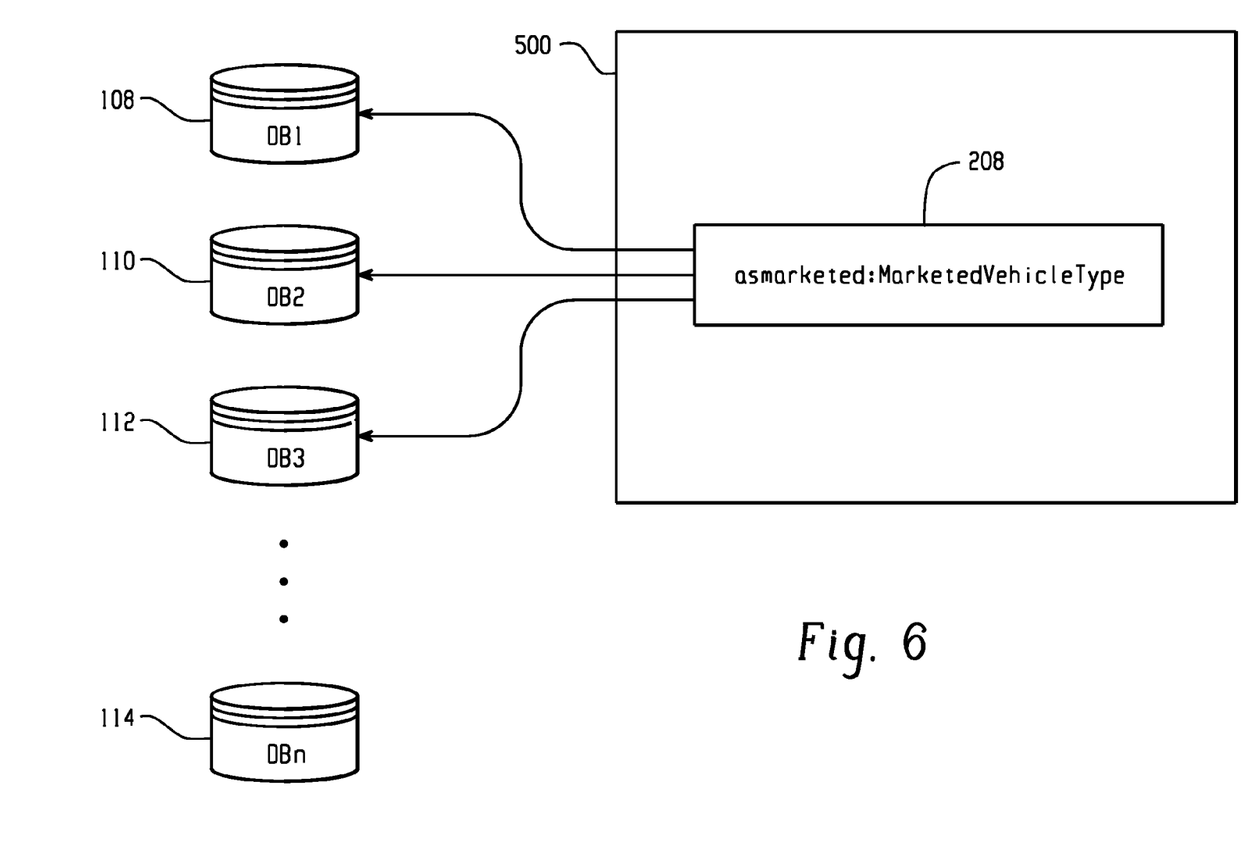
FIG. 6 depicts an exemplary mapping from an ontology field to various data sources that may be utilized by exemplary embodiments.

Turning now to FIG. 6, an exemplary mapping from an ontology field to various data sources will now be described in accordance with exemplary embodiments. In exemplary embodiments, FIG. 6 depicts the mapping of block 208, "asmarketed:MarketedVehicleType", from the federated ontology 500 of FIG. 5 to the data storage devices 108-114 of FIG 1. The federated ontology 500 of FIG. 5 may be equivalent to the federated ontology 116 of FIG. 1, with the localized ontologies 122 and 124 equivalent to the localized ontologies 200 and 300 of FIGS. 2 and 3.

Figure 7:
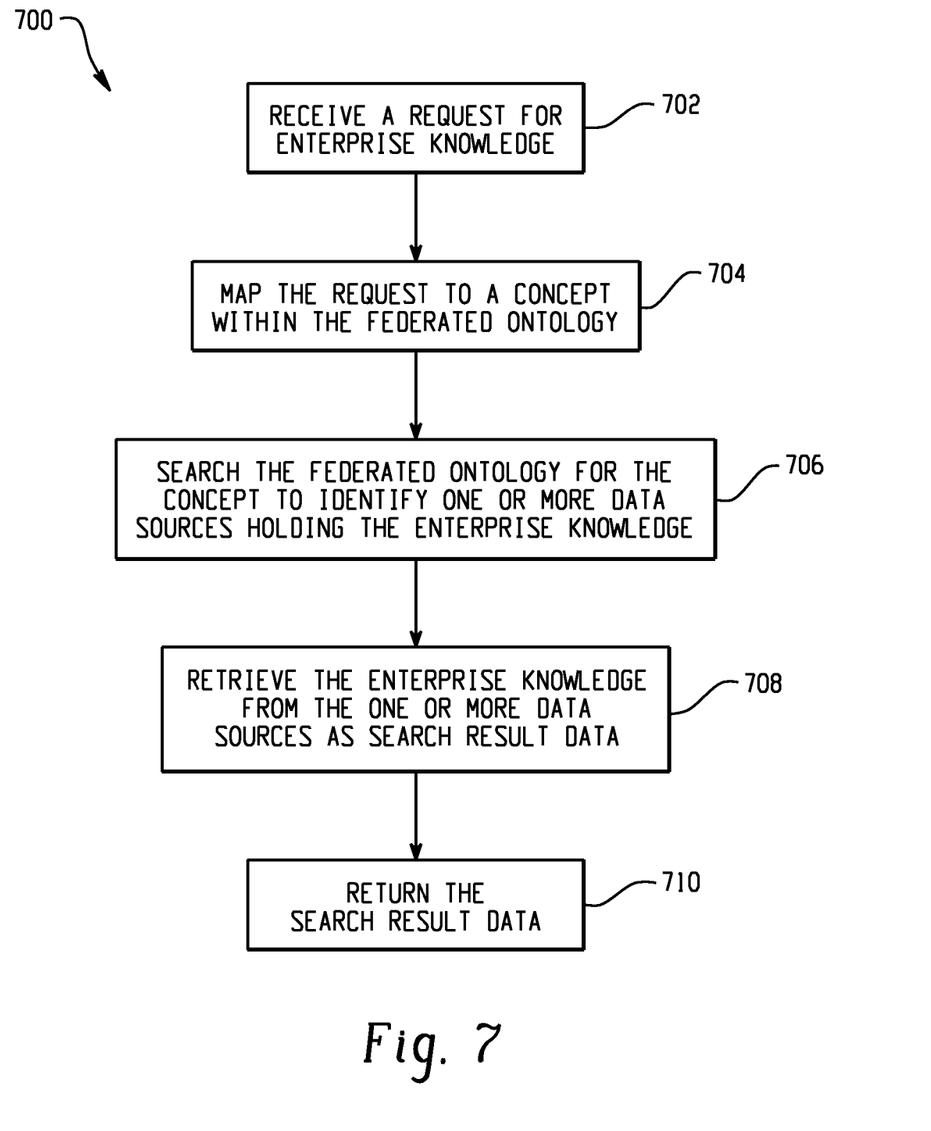
FIG. 7 depicts an exemplary process flow that may be implemented by exemplary embodiments to use a federated ontology as an index to enterprise knowledge.

Turning now to FIG. 7, a process 700 for using a federated ontology as an index to enterprise knowledge will now be described in accordance with exemplary embodiments in reference to the system 100 of FIG. 1. In exemplary embodiments, at block 702, the semantic router application 118 receives a request for the enterprise knowledge. The request may be initiated by a user of the user systems 104 or may be from the agent application 120. In exemplary embodiments, the request is formatted as a question inquiring about the enterprise knowledge, such as, "Is part assembly information captured and stored during the product build process?" or "How many warranty claims have been submitted against part XYZ1923?" At block 704, the semantic router application 118 maps the request to one or more concepts within the federated ontology 116. Mapping may involve parsing the request or question into a query elements and translating the query elements into concepts and/or relationships contained within the federated ontology 116. The parsing and translating may be done by any method known in the art, such as tokenization and look-up operations through a semantic dictionary or thesaurus.

At block 706, the semantic router application 118 searches the federated ontology 116 for the one or more concepts to identify one or more data sources, such as data stored in data storage devices 108-114, holding the enterprise knowledge. The searching may also include relationships within the federated ontology 116. The search algorithm may be any search algorithm known in the art. Once the enterprise knowledge is located, the enterprise knowledge data and/or data source location can be retrieved.

At block 708, the semantic router application 118 retrieves the enterprise knowledge from the identified one or more data sources as search result data. The search result data may include traceability data for warranty claims. In exemplary embodiments, the semantic router application 118 formats the search result data as an answer to the question, such as, "There have been 87 warranty claims submitted against part XYZ1923."

At block 710, the semantic router application 118 returns the search result data. The search result data may report an information path to the enterprise knowledge from the identified one or more data sources, such as the location of DB1 on data storage device 108. The semantic router application 118 or the agent application 120 may perform computations or generate a summary of the search results, such calculating the cost of warranty claims for a part, and generating a report on a per supplier basis. The search result data returned to the user systems 104 can be in a format readable by a Web browser program, such as HTML, XML, or similar formats. In alternate exemplary embodiments, the search result data is returned in a text file, a comma delimited file, or other formats known in the art.

When the user system 104 utilizes the agent application 120 to request the enterprise knowledge, additional processing may be performed by the agent application 120. Through the agent application 120, a notification threshold value is established for the search results. Any value or parameter within the search results can be monitored by the agent application 120, such as the number of warranty claims against a particular supplier. Once the initial request has been submitted through the agent application 120, the request may be periodically reinitiated at a specified interval, such as daily, weekly, monthly, quarterly, and so forth. When search result data is returned from the semantic router application 118 after each request generated by the agent application 120, the agent application 120 checks the search result data to determine whether the notification threshold value has been exceeded (e.g., could be above or below the notification threshold value depending upon implementation). The notification threshold value may be a relative value (e.g., a percentage), an absolute value, a positive value, or a negative value. In exemplary embodiments, the agent application 120 can perform trending over periods of time, such as a moving average, a standard deviation, a variance, and other statistical analysis techniques known in the art. When it is has been determined that the notification threshold value has been exceeded, a message or alert may be sent to the user systems 104, targeting an individual user or groups of users in the form of a file or an electronic mail message (e-mail).

Technical effects and advantages of exemplary embodiments include using a federated ontology as an index to enterprise knowledge. The federated ontology may enable a search of a greater breadth of information by linking localized ontologies, wherein the localized ontologies are mapped to one or more data sources. A semantic router may be used to search the federated ontology for the requested enterprise knowledge and identify the location and/or existence of the data source of the requested enterprise knowledge. An agent application may provide periodic monitoring and notification of exceeding a threshold related to the enterprise knowledge.

An embodiment of the invention may be embodied in the form of computer-implemented processes and apparatuses for practicing those processes. The present invention may also be embodied in the form of a computer program product having computer program code containing instructions embodied in tangible media, such as floppy diskettes, CD-ROMs, hard drives, universal serial bus (USB) drives, or any other computer readable storage medium, such as read-only memory (ROM), random access memory (RAM), and erasable-programmable read only memory (EPROM), for example, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for using a federated ontology as an index to business enterprise knowledge, comprising:
  receiving a request for the business enterprise knowledge;
  mapping the request to a concept within the federated ontology, wherein the federated ontology comprises a plurality of localized ontologies that are linked through one or more concepts;
  searching the federated ontology for the concept to identify one or more data sources holding the business enterprise knowledge;
  retrieving the business enterprise knowledge from the identified one or more data sources as search result data; and
  returning the search result data.

2. The method of claim 1, wherein the request for the business enterprise knowledge is formatted as a question inquiring about the business enterprise knowledge, and further comprising formatting the search result data as an answer to the question.

3. The method of claim 1, wherein the federated ontology is comprised of a first localized ontology linked with a second localized ontology through a common concept contained within each of the first and second localized ontologies.

4. The method of claim 3, wherein access to the business enterprise knowledge contained within the first and second localized ontologies is controlled based upon permissions or security clearance of each user requesting the business enterprise knowledge.

5. The method of claim 3, wherein the first localized ontology models concepts linked by at least one relationship for a product as assembled and the second localized ontology models concepts linked by at least one relationship for the product as marketed.

6. The method of claim 5, wherein the product is a vehicle.

7. The method of claim 3, wherein at least one of the first and second localized ontologies includes information related to warranty claims.

8. The method of claim 7 further comprising:
  tracing the warranty claims for a part;
  calculating a cost of the warranty claims for the part; and
  reporting the calculated cost of the warranty claims on a per supplier basis.

9. The method of claim 1 further comprising:
  semantically tagging data within the one or more data sources holding the business enterprise knowledge; and
  linking the semantic data tags to the federated ontology.

10. The method of claim 1 further comprising:
reporting an information path to the business enterprise knowledge from the identified one or more data sources.

11. The method of claim 1, wherein the federated ontology includes information related to a vehicle, parts incorporated in the vehicle, warranty claims for the vehicle, suppliers of the parts, and an assembly plant that assembled the parts into the vehicle.

12. A method for using a federated ontology as an index to enterprise knowledge, comprising:
receiving a request for the enterprise knowledge;
mapping the request to a concept within the federated ontology;
searching the federated ontology for the concept to identify one or more data sources holding the enterprise knowledge;
retrieving the enterprise knowledge from the identified one or more data sources as search result data; and
returning the search result data;
establishing a notification threshold value for the search result data;
initiating the request;
notifying a user when a value in the search result data exceeds the notification threshold value; and
periodically reinitiating the request at a specified interval.

13. A system for using a federated ontology as an index to business enterprise knowledge, comprising:
a host system;
one or more storage devices in communication with the host system, the one or more storage devices holding data sources of the business enterprise knowledge;
a federated ontology accessible via a host system, wherein the federated ontology comprises a plurality of localized ontologies that are linked through one or more concepts; and
a semantic router application executing on the host system, the semantic router application including computer instructions for performing:
receiving a request for the business enterprise knowledge;
mapping the request to a concept within the federated ontology;
searching the federated ontology for the concept to identify the one or more data sources holding the business enterprise knowledge;
retrieving the business enterprise knowledge from the identified one or more data sources as search result data; and
returning the search result data.

14. The system of claim 13, wherein the request for the business enterprise knowledge is formatted as a question inquiring about the enterprise knowledge, and the semantic router application further performs:
formatting the search result data as an answer to the question.

15. The system of claim 13, wherein the federated ontology is comprised of a first localized ontology linked with a second localized ontology through a common concept contained within each of the first and second localized ontologies.

16. The system of claim 15, wherein at least one of the first and second localized ontologies includes information related to vehicle warranty claims.

17. The system of claim 16, wherein the semantic router application further includes computer instructions for performing:
tracing the vehicle warranty claims for a vehicle part;
calculating a cost of the vehicle warranty claims for the vehicle part; and
reporting the calculated cost of the vehicle warranty claims on a per supplier basis.

18. A system for using a federated ontology as an index to enterprise knowledge, comprising:
a host system;
one or more storage devices in communication with the host system, the one or more storage devices holding data sources of the enterprise knowledge;
a federated ontology accessible via a host system; and
a semantic router application executing on the host system, the semantic router application including computer instructions for performing:
receiving a request for the enterprise knowledge;
mapping the request to a concept within the federated ontology;
searching the federated ontology for the concept to identify the one or more data sources holding the enterprise knowledge;
retrieving the enterprise knowledge from the identified one or more data sources as search result data; and
returning the search result data; and
an agent application executing on the host system, the agent application including computer instructions for performing:
establishing a notification threshold value for the search result data;
initiating the request to the semantic router application;
notifying a user when a value in the search result data exceeds the notification threshold value; and
periodically reinitiating the request to the semantic router application at a specified interval.

19. The system of claim 13, wherein the semantic router application further includes computer instructions for performing:
reporting an information path to the business enterprise knowledge from the identified one or more data sources.

20. A computer program product for using a federated ontology as an index to business enterprise knowledge, the computer program product comprising:
a storage medium readable by a processing circuit and storing instructions for execution by the processing circuit for implementing a method, the method comprising:
receiving a request for the enterprise knowledge, wherein the request for the enterprise knowledge is formatted as a question inquiring about the business enterprise knowledge;
mapping the request to a concept within the federated ontology, wherein the federated ontology is comprised of a first localized ontology linked with a second localized ontology through a common concept contained within each of the first and second localized ontologies;
searching the federated ontology for the concept to identify one or more data sources holding the business enterprise knowledge;
retrieving the business enterprise knowledge from the identified one or more data sources as search result data;
formatting the search result data as an answer to the question; and
returning the search result data formatted as the answer to the question.

* * * * *